United States Patent [19]

Ruth et al.

[11] Patent Number: 4,695,677
[45] Date of Patent: Sep. 22, 1987

[54] WIRE TENSIONING SYSTEM

[76] Inventors: Dale G. Ruth, 12021 Donna Ct. NE., Albuquerque, N. Mex. 87112; Robert J. Yuhas, 824 Omaha NE., Albuquerque, N. Mex. 87123

[21] Appl. No.: 742,117

[22] Filed: Jun. 6, 1985

[51] Int. Cl.$^4$ .................. H02G 7/02; H01B 17/16; A01K 3/00; G08B 13/26
[52] U.S. Cl. ..................... 194/45 TD; 29/281.1; 29/283; 29/446; 174/161 F; 174/163 F; 248/65; 248/218.4; 248/230; 248/231.8; 256/10; 256/39; 267/69; 267/158; 340/564
[58] Field of Search ......... 174/40 TD, 45 TD, 158 F, 174/161 R, 161 F, 163 R, 163 F; 24/129 A; 248/65, 72, 230, 49, 74.1, 74.2, 231.8, 218.4; 256/10, 37, 39, DIG. 1; 267/158, 160, 164, 69, 73, 74; 340/564; D13/17, 18; 313/278; 211/119.15

[56] References Cited

U.S. PATENT DOCUMENTS

| | | | |
|---|---|---|---|
| 126,417 | 5/1872 | Sellers et al. | 256/37 |
| 443,465 | 12/1890 | Seldner | 267/69 |
| 655,219 | 8/1900 | Frischmuth | 174/40 TD X |
| 1,189,476 | 7/1916 | Pewther | 248/231.8 X |
| 1,362,221 | 12/1920 | Blackmore | 174/161 R X |
| 1,926,128 | 9/1933 | Van Steenis | 248/65 X |
| 2,961,479 | 11/1960 | Bertling | 174/146 X |
| 3,504,108 | 3/1970 | Kihs | 248/230 X |
| 3,745,401 | 7/1973 | Stapleton et al. | 313/278 X |
| 3,801,731 | 4/1974 | Hansen | 248/230 X |

FOREIGN PATENT DOCUMENTS

| | | | |
|---|---|---|---|
| 231334 | 11/1960 | Australia | 248/74.2 |
| 607740 | 4/1926 | France | 248/230 |
| 1232718 | 8/1969 | France | 174/163 F |
| 2407591 | 5/1979 | France | 174/45 TD |
| 1218383 | 1/1971 | United Kingdom | 267/160 |

OTHER PUBLICATIONS

*Television Retailing*, Jan. 1953, p. 93.

*Primary Examiner*—Laramie E. Askin
*Attorney, Agent, or Firm*—Samual M. Freund; David K. Cornwell

[57] ABSTRACT

A temperature and stretch compensating wire tensioning system. In parallel wire capacitive security systems, the maintenance of proper tension in the sensor wires in essential in order that false alarms be avoided as a result of movement of the sensor wires in the absence of an intruder. In the present invention, "V"-shaped plastic tensioners are used on several of the wire support posts in cooperation with wire guides on other posts to provide the requisite wire tension. The plastic tensioners are constructed from pairs of identical elongated arms each having an open loop at the proximal end thereof adapted to snap onto a support post for easy assembly of a security system in a manner which keeps them perpendicular to the longitudinal axis of the post and directed tangentially away from the outer surface thereof. Rotation of the tensioning arms relative to each other is effectively prevented by an interlocking tab on each of the tensioners attached to the open loop and directed away from the plane thereof in such a manner that the corresponding tab on each tensioning member engages that of its associated sister tensioning member forming the pair thereby preventing relative motion of the tensioning members and forming the "V"-pattern.

5 Claims, 4 Drawing Figures

WIRE TENSIONING SYSTEM

BACKGROUND

There are many applications in industry for wire tensioning devices. In security systems, for instance, a set of parallel wires may be stretched around the perimeter of an area; the wires acting as capacitors. When the dielectric constant between the wires changes because an intruder or other object has changed the characteristic of the dielectric, the capacitance changes and triggers an alarm. In this type of system it is imperative that the wires are parallel, that they retain a relatively constant tension and that they are insulated from any support poles. These requirements are not trivial because variations of temperature can cause the wire to expand and contract. The change in length of the wire is a function of the original length of the wire, the change in temperature, and the coefficient of expansion of the material from which the wire is made.

Previous attempts to solve the difficulties associated with keeping tension on wires have not been entirely successful. One way to compensate for the changes of length due to thermal expansion is to attach helical springs to the ends of the wires, the helical springs expanding when the temperature drops and the wires contract, and contracting when the associated wire expands. The use of helical springs, however, has several prohibitive drawbacks. First, the helical spring itself does not act as a capacitor and therefore there is a dead spot in the security system which extends through the spring, through the pole to which the spring is attached, and possibly through a spring on the other side of the pole if the security fence continues. This dead zone increases as the ambient temperature decreases because the springs expand.

The second problem associated with helical springs is that the springs cannot be attached directly to support poles unless either the poles or the springs are electrically insulating material. Typically, the fence posts utilized in industry are metallic and replacing these posts would be costly. One way that industry has dealt with the problem of attaching metallic helical springs to a metallic post is by attaching a non-metallic bracket to the post and then connecting the spring to the bracket. This procedure has high installation and material cost, however.

SUMMARY OF THE INVENTION

Accordingly, it is an object of the present invention to provide a wire tensioning system including a device for maintaining substantially constant tension in a wire independent of the effects of temperature and stretching thereon.

Another object of our invention is to provide a wire tensioning device for use in perimeter security systems having continuous detection characteristics, especially in the vicinity of the support posts.

Yet another object of the present invention is to provide an inexpensive wire tensioning device which may be easily installed as an original system or used to retrofit an existing system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the system hereof may include an elongated tensioning arm having significant flexibility in a direction perpendicular to the elongated dimension thereof; means attaching a wire near the distal end of the elongated tensioning arm; and means for rigidly affixing the proximal end of the elongated tensioning arm to an elongated support member such that the elongated tensioning arm is disposed substantially perpendicularly to the longitudinal axis of this elongated support member and directed substantially tangentially away therefrom, whereby tension is generated in the wire which is substantially rigidly affixed to another elongated support member as a result of a restoring force generated by the intentional initial flexing of the elongated tensioning arm in a direction toward the second support member when the wire is first affixed to the elongated tensioning arm.

In a further aspect of the present invention, in accordance with its objects and purposes, the system hereof includes two elongated tensioning arms substantially identical to the elongated tensioning arm described in the previous paragraph hereof attached in the same manner to the elongated support member and placed alongside and in contact with one another such that the tab of each elongated tensioning member reversibly interlocks with that of the other thereby preventing substantial rotation of the two elongated tensioning arms relative to one another about the cylindrical elongated support member in at least one direction, each elongated tensioning arm further having a wire attached thereto utilizing wire attaching means directed in an approximately opposite direction to the wire similarly attached to the other, whereby the force exerted by the wire attached to one elongated tensioning arm tending to rotate it is substantially balanced by the substantially oppositely directed force exerted by the wire attached to the other elongated tensioning arm thereby reducing the tendency of the two elongated tensioning arms to rotate about the elongated support member.

Benefits and advantages of the present invention include the ease of original installation of the wire tensioning devices used in the present invention in a perimeter security system and the ease of retrofitting an existing security system with our tensioners.

BRIEF DESCRIPTION OF THE DRAWINGS

The accompanying drawings, which are incorporated in and form a part of the specification, illustrate the present invention and, together with the written description, serve to explain the principles of the invention. In the drawings.

DETAILED DESCRIPTION OF THE PREFERRED EMBODIMENT

Figure 1:
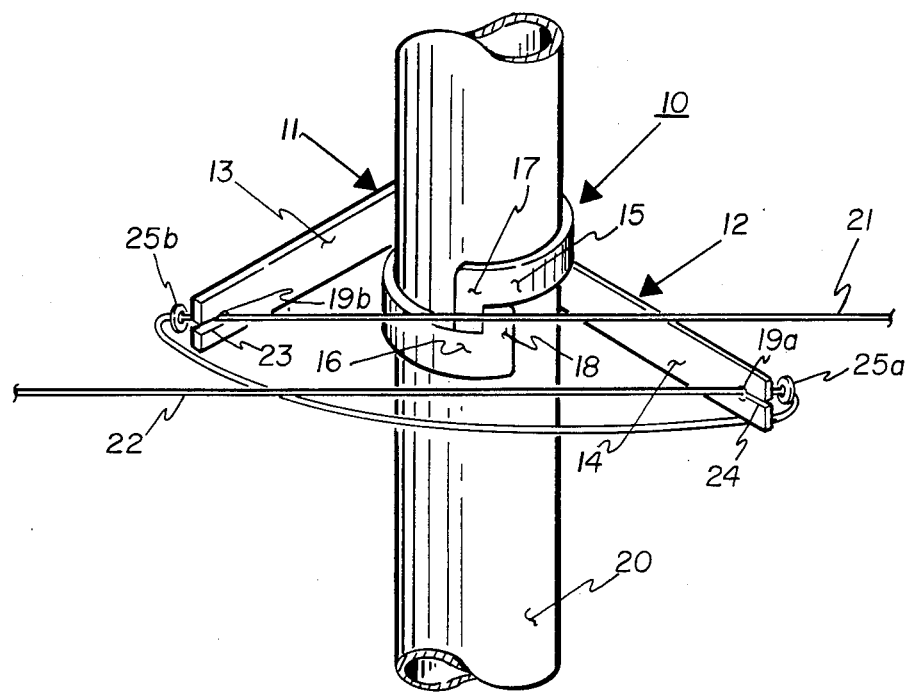
FIG. 1 is an orthographic view of the wire tensioner device of the present invention.

Reference will now be made in detail to the present embodiment of the invention, an example of which is illustrated in the accompanying drawings. Similar or identical structure is identified using identical numbers throughout. Turning now to FIG. 1, one embodiment of the present invention, designated 10, is shown. A pair of tensioners, 11 and 12, are snapped onto a support pole 20. The tensioners include elongated arms, 13 and 14, loop portions, 15 and 16, for snap fitting about the support pole and interlocking shoulders, 17 and 18, for ensuring that the elongated arms 13 and 14 form an angle of approximately 90° with each other. The shoulders prevent rotation when equal forces are applied to the ends of the elongated arms 13 and 14. This is important when the elongated arms 13 and 14 are initially flexed in a direction toward each other. Because of the interaction of shoulders, 17 and 18, with the wires to be kept under tension, as will be described hereinbelow, the tensioners do not rotate about the support pole 20.

At the distal ends of the elongated arms, 13 and 14, there are holes 19a and 19b for attaching either a single wire or a pair of wires described as wires 22 and 21. In the embodiment shown in figure 1, wires 21 and 22 are attached respectively near the distal ends of the elongated arms 13 and 14 by slipping the wires 21 and 22 through angled slots 23 and 24, respectively. The slots lead from the outside distal end of the elongated arms to the holes 19a and 19b. Angling the slots enables the wires to be inserted easily particularly when the wires are under tension. Crimped washers 25a and 25b are used to prevent the wires from passing through the holes.

The wires are shown to be attached such that each wire crosses over or under the flat elongated arm to which the wire is not attached. This is the preferred configuration for our invention since if the present invention is used as part of security system where pairs of wires act as capacitors, there are no "dead zones" near the support posts. A system using helical springs as tensioners would not have this advantage.

Figure 2:
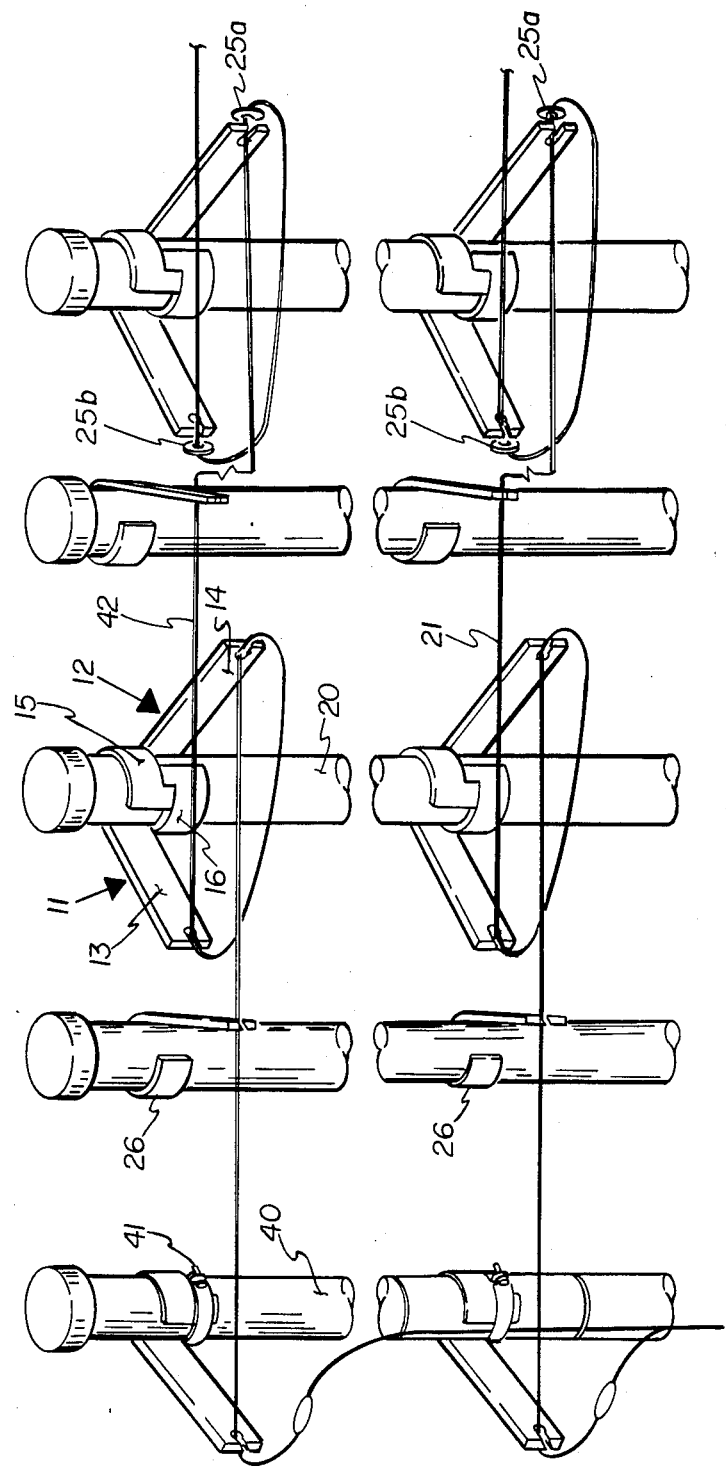
FIG. 2 schematically depicts the cooperation of the tensioner device of the present invention with identical tensioners and other components in its immediate vicinity as would be required in the operation of a security structure utilizing our invention.

FIG. 2 shows the cooperation among several pairs of tensioners where clearly, to maintain electrical integrity in the situation where more than one wire is employed, a jumper cable would be required to connect the wires. As shown in FIG. 2, the tensioners are not generally provided for every support post of a fence utilizing the present invention. Each pair of elongated arms forms an approximately right angle when there is not tension exerted by an attached wire 21. Angles other than 90° between the elongated portions 13 and 14 can also be used. Approximately equal length wires are initially loaded to a predetermined tension so if the ambient temperature drops and the wires contract, the elongated portions will flex to take up the amount of contraction. Since both tensioners 11 and 12 are set up to have closely equal and opposite applied forces, there will be little tendancy for rotation of the tensioning arms about the support post. Similarly, if the ambient temperature rises causing the wires to expand, the elongated portions 13 and 14 will absorb the slack.

Figure 3:
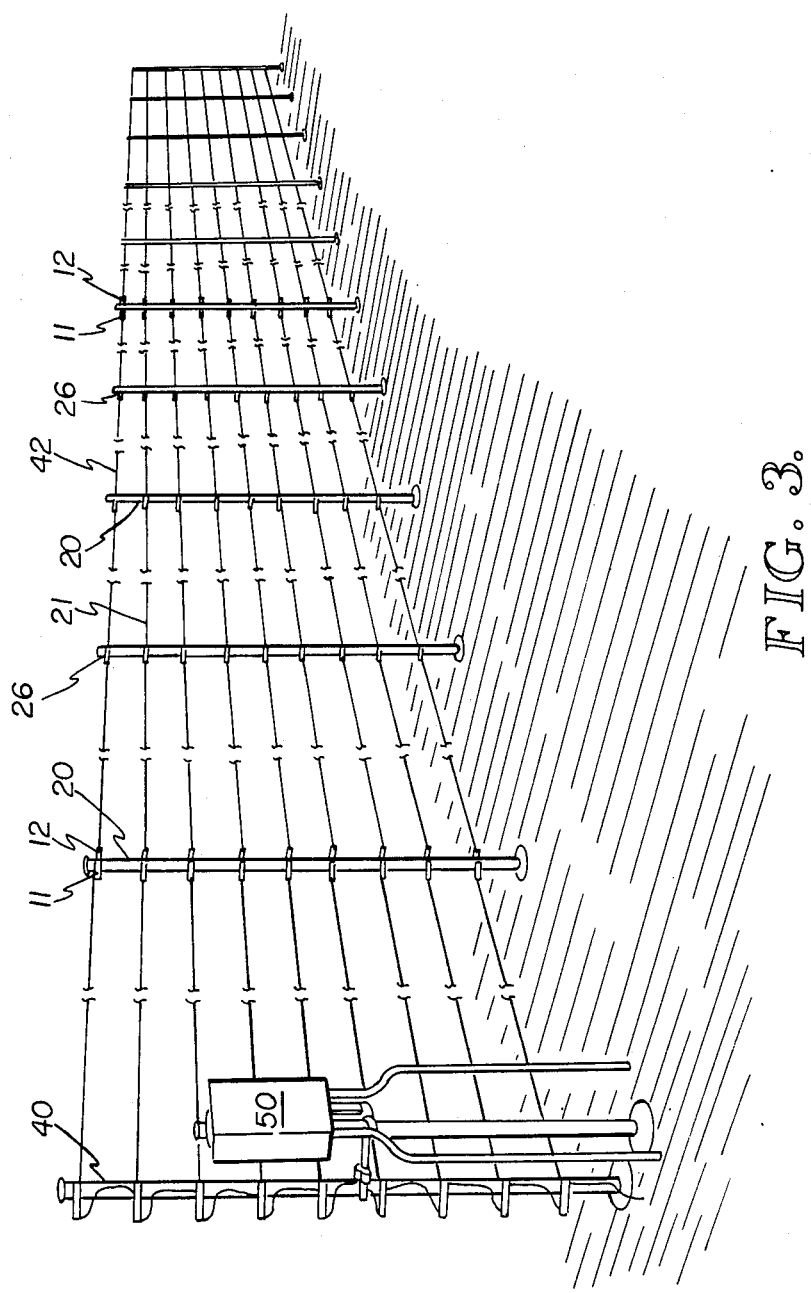
FIG. 3 is a schematic representation of a length of security fence showing the general arrangement of the components shown in FIG. 2 hereof in a more expansive integrated system.

FIG. 3 allows the use of the tensioners of the present invention in a capacitive security system. End posts 40 would not require a pair of tensioners since only a single wire would originate therefrom. A single tensioner arm according to the present invention could be used and a conventional clamp 41 would then, for this purpose, be used to assist this tensioner from rotating about the support post 40 (see FIG. 2). Typically steel posts 20 are imbedded in the ground. The tensioners have open, expandable loops 15 and 16 which are slightly smaller than the diameter of the posts 20 so that when they are snapped onto the post 20 they provide a relatively secure grip on the post. Shown in FIG. 3 is an array of eight balanced bridge capacitance sensors configurated as a vertical grid of parallel wires. The array also includes a first ground wire 42 which can be the top wire of the grid and a second ground wire buried several inches below the ground (not shown). The eight parallel wires are attached at one end to an electronic power and sensor apparatus 50. The wire is strung through guide clips 26 which are similarly shaped to the tensioners. The guides are more explicitly shown in FIG. 2 hereof. In the event that the elongated tensioning arms of our invention are used as tensioners on the end posts, the interlocking shoulders, 17 and 18, can be used to provide a surface for clamping to the post. These interlocking shoulders are not needed in the guide clips 26 because the wire simply is passed through the clip end hole through an angled slot and there is no appreciable turning force exerted on the clip itself.

The tensioners and the guide clips can be made out of any flexible, electrically nonconductive material which allows the tensioners 11 and 12 and clips 26 to snap onto the post 20.

Figure 4:
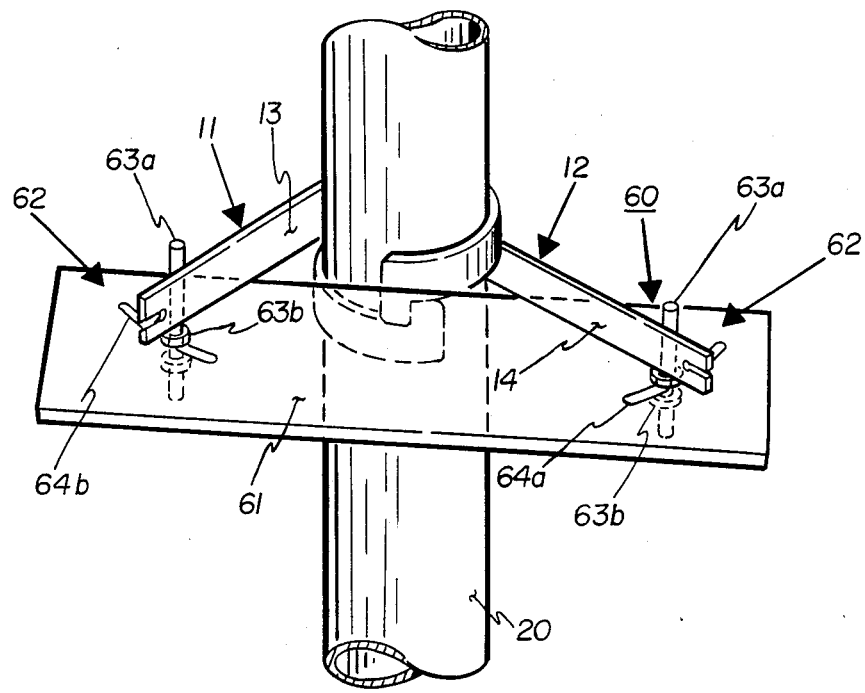
FIG. 4 shows a schematic representation of an apparatus for pretensioning the tensioners of the present invention as described in FIG. 1. hereof.

When installing the wire 21, the tensioners must be pretensioned as a function of the ambient temperature. FIG. 4 illustrates a device 60 for pretensioning the wire. The pretensioning device includes flat body 61. Projecting perpendicularly through arcuate slots 64a and 64b in opposite directions in the flat body 61 are two retaining means 62, each comprising a threaded rod 63a and a nut 63b. This allows the threaded rod to be moved to any position along the arcuate slot and fixed there. The two elongated portions 13 and 14 of the cooperating tensioners 11 and 12 are manually forced together, and the pretensioning device inserted between them such that when the elongated tensioner arms are released, each arm is held in a flexed position by one of the threaded rods. The retaining means are positioned along the arcuate slot to predetermined locations depending on the ambient temperature. The elongated arms of the tensioner sweep out a similar arc to that of the arcuate shaped slots. If the ambient temperature is high during installation, the wire will have expanded so it is important to flex the elongated arms a greater amount than if the ambient temperature was lower. The arcuate slots may be graduated with temperature markings to allow the user to easily set the tension. The same procedure can be used for the tensioners on the end posts 40 where only one tensioner is utilized, if it is desirable to pretension them.

When the tensioners 11 and 12 are installed, they must be configured so the tensioned wires 21 and 22 are as close to parallel to the plane of the posts 20 as possible. One way for this to be done is to make certain that the wire 21, originating at one tensioner 11, crosses over or under a zone marked on its sister tensioner 12. The tensioners 11 and 12 can be rotated about the support post until the desired wire orientation is obtained.

A second embodiment of the invention is to combine the tensioners 11 and 12 shown in FIG. 1 into a single monolithic dual tensioner. In order for dual tensioner to function in the same manner as would two cooperating tensioners, the slot used to snap the monolithic dual tensioner would be located on the open loop within the angle formed by the elongated tensioner arms. One possible variation of the monolithic tensioner embodiment would be to place two adjacent holes near the distal end of each of the elongated tensioner arms 13 and 14 in a line perpendicular to the elongated dimension thereof. In this manner, one wire could be anchored in the top hole of one arm and pass through the top hole of the other arm. Similarly, the wire anchored on the bottom hole and extending in the opposite direction of the wire passing through the top holes could pass through the bottom hole on the other arm.

The tensioners described above are preferably injection molded using conventional methods.

Lexan$^R$ was used in the construction of the apparatus of the present invention because it is flexible and difficult to break under expected conditions. It is also resistant to ultraviolet radiation.

An advantage of the present invention over apparatus employing helical springs is that the tensioners hereof have a more constant tension. By changing the shape of the elongated arm so that it tapers to a shorter width at the distal end, the tension only varies slightly between the highest and lowest possible ambient temperatures. While it is important to maintain tension in wires, the tension must not be so high that the wires snap.

While the apparatus herein disclosed and described constitute preferred forms of the invention, it is also to be understood that modifications and alterations within the spirit of the invention are anticipated, and that such mechanical arrangements and adaptations as fall within the scope of the appended claims are intended to be included herein.

We claim:

1. A tensioned wire system, comprising:
   a. an elongated support member;
   b. a first tensioner including a first elongated tensioning arm having flexibility in a direction perpendicular to the elongated dimension thereof, means for receiving and holding wire at the distal end thereof and means for affixing said first tensioner to said elongated support member in a direction substantially perpendicular to the longitudinal axis of said support member, said first tensioner being attached to said elongated support member by said affixing means;
   c. a second tensioner substantially identical to said first tensioner and having a second elongated tensioning arm, said second tensioner attached in a similar manner to said elongated support member and placed alongside said first tensioner, said first tensioner and said second tensioner oriented to form a V-shape in a plane perpendicular to the longitudinal axis of said elongated support member;
   d. means for interconnecting said first tensioner and said second tensioner, whereby said first tensioner and said second tensioner are prevented from rotating about the axis of said elongated support member when substantially equal and opposite forces are applied to the distal ends of said first and second tensioners;
   e. a first wire segment connected to the distal end of said first tensioner by said first means for receiving and holding wire;
   f. a second wire segment connected to the distal end of said second tensioner by a second means for receiving and holding wire;
   g. means for applying force in a chosen direction to the end of said first wire segment not connected to the distal end of the first tensioner, the force being sufficient to deflect said first tensioning arm in the direction of the force, whereby the combination of the force applied to the end of the first wire segment and the restorative force of the deflected first tensioning arm provides tension to said first wire segment; and
   h. means for applying a second force to the end of said second wire segment not connected to the distal end of the second tensioner in a direction approximately opposite the force applied to the first wire segment, the force being sufficient to deflect said second tensioning arm in the direction of the second force whereby the combination of the second force and the restorative force of the deflected second tensioning arm provides tension to said second wire segment.

2. The system as described in claim 1, wherein said means for affixing said first tensioner to said elongated support member includes an expandable substantially circular open clamp member for attaching said first tensioner to said elongated support member.

3. The system as described in claim 2, wherein said open clamp member is integral to said first elongated tensioning arm.

4. The system as described in claim 1, wherein said means for interconnecting said first and second tensioners include a first tab extending from the proximal end of said first tensioner in a direction parallel to the longitudinal axis of said support member and a second tab extending from the proximal end of said second tensioner in a direction parallel to the longitudinal axis of said support member, said first and second tabs being oriented to interlock to prevent rotation of said first and second tensioners in at least one direction when tension is applied to said first and second wire segments.

5. The system as described in claim 4 wherein said first and second tensioners are electrically insulating.

* * * * *